United States Patent [19]
Babcock et al.

[11] Patent Number: 4,900,502
[45] Date of Patent: Feb. 13, 1990

[54] HOLLOW FIBER ANNEALING

[75] Inventors: Walter C. Babcock; Scott B. McCray; Edward D. LaChapelle, all of Bend; Kris A. Krichko, Hubbard, all of Oreg.

[73] Assignee: Bend Research, Inc., Bend, Oreg.

[21] Appl. No.: 267,979

[22] Filed: Nov. 7, 1988

Related U.S. Application Data

[63] Continuation-in-part of Ser. No. 770,857, Aug. 29, 1985.

[51] Int. Cl.$^4$ .............................................. B29C 35/04
[52] U.S. Cl. ............................... 264/346; 210/500.23; 210/500.39; 210/500.41; 210/500.42; 264/41; 264/235
[58] Field of Search .................... 264/235, 346, 41; 210/500.39, 500.41, 500.23, 500.36, 490, 500.42

[56] References Cited

U.S. PATENT DOCUMENTS

| | | | |
|---|---|---|---|
| 2,517,570 | 8/1950 | Irons | 264/346 |
| 2,517,581 | 8/1950 | Lowry et al. | 264/346 |
| 2,990,580 | 7/1961 | Foster | 264/346 |
| 3,197,538 | 7/1965 | Capron et al. | 264/235 |
| 3,293,341 | 12/1966 | Boeke et al. | 264/346 |
| 3,615,024 | 10/1971 | Michaels | 210/490 |
| 3,619,461 | 11/1971 | Gay | 264/346 |
| 3,707,592 | 12/1972 | Ishii et al. | 264/235 |
| 4,290,987 | 7/1981 | Soehngen et al. | 264/235 |

FOREIGN PATENT DOCUMENTS 46-20600  6/1971  Japan .

OTHER PUBLICATIONS

Ziabicki; "Fundamentals of Fiber Formation"; John Wiley & Sons (1976), p. 447.
Park; "Plastics Film Technology"; Kreiger Publishing (1973), p. 32.
Kirk–Othmer, "Encyclopedia of Chemical Technology"; 3rd Ed., vol. 18, John Wiley & Sons (1982), pp. 605–611.
Harper Editor, "Handbook of Plastics and Elastomers"; McGraw Hill (1975), pp. 1-61, 1-62, 1-64, 1-65.

*Primary Examiner*—Hubert C. Lorin
*Attorney, Agent, or Firm*—Chernoff, Vilhauer, McClung & Stenzel

[57] ABSTRACT

A process for improving both the internal burst strengths and gas and water permeabilities of certain microporous polymeric hollow fibers useful in RO applications comprises a wet annealing process for certain such fibers.

2 Claims, No Drawings

HOLLOW FIBER ANNEALING

The government has rights in this invention under Contract No. 14-34-0001-2421 awarded by the Department of Interior, Office of Water Research and Technology, and under Contract No. DAAK-70-0-85-C-0059 awarded by Department of Defense of the U.S. Army.

This is a continuation-in-part of application Ser. No. 770,857, filed Aug. 29, 1985.

BACKGROUND OF THE INVENTION

The use of lumen-side feed inside-skinned polymeric composite hollow fiber membranes for reverse osmosis applications is disclosed in commonly-assigned U.S. application Ser. No. 702,421 filed Feb. 13, 1985, now abandoned. In reverse osmosis (RO) applications, the internal burst pressures of the hollow fiber supports of such composite membranes constitute a critical factor in the performance of the fibers; in general, the higher the internal burst pressure of a given hollow fiber support, the better the RO performance of the composite membrane will be. In RO applications for desalination of sea water, for example, due to the high osmotic pressure of sea water itself, dynamic or operating pressures in the neighborhood of 800 psi are required. However, with conventional casting techniques, hollow fibers with operational burst strengths of only around 400 psi are obtainable. In addition, hollow fibers having high water permeability are highly desirable in RO applications.

There is therefore a need in the art for hollow fibers capable of greater operational internal burst pressures than are obtainable with conventional casting techniques. There is also a need in the art for hollow fibers having increased water permeability. These needs and others are met by the process of the present invention, which is summarized and described in detail below.

SUMMARY OF THE INVENTION

There are essentially two aspects to the present invention. In its broadest aspect, the present invention comprises a process for increasing the internal burst pressures of certain microporous polymeric hollow fibers comprising heating such fibers at temperatures approaching, but not exceeding, the glass transition temperatures of the polymers the fibers are made of. In a second aspect, the present invention comprises a process for increasing both the internal burst pressures and the gas and water permeability of certain microporous polymeric hollow fibers comprising heating the same in hot water at a temperature of from 70° C. to 160° C.

DETAILED DESCRIPTION OF THE INVENTION

According to the present invention, both the static and dynamic internal burst pressure, or pressure at which a microporous polymeric hollow fiber will burst when pressure is applied to the inside or lumens of such a fiber, has been found to be greatly increased by heating such fibers for a period of time at temperatures not exceeding the glass transition temperature of the polymer from which the fiber is made.

Typically, such microporous polymeric holow fibers are made of polymers such as polysulfones, polyethersulfones, polyphenylsulfones, polyvinylidenefluorides, polyimides and polyetherimides by spin casting techniques known in the art and generally comprising forcing a solution of fiber-forming polymer with a pore-forming material through a tube-in-orifice spinnerette having a lumen-forming liquid such as water simultaneously forced through the tube of the spinnerette so as to define a bore or lumen for the fiber. Glass transition temperatures of many such polymers are known. See, for example, Brandrup, et al., *Polymer Handbook*, Vol. 3, pp. 139–179 (1975). Table I below indicates the glass transition temperatures for the types of polymers mentioned above.

TABLE I

| Polymer | Glass Transition Temperatures |
|---|---|
| Polysulfone | 180° C. |
| Polyethersulfone | 220° C. |
| Polyphenylsulfone | 190° C. |
| Polyvinylidenefluoride | 141° C. |
| Polyimide | 314° C. |
| Polyetherimide | 217° C. |

The glass transition temperature of a given polymer is empirically ascertainable by a dilatometer, which is capable of monitoring the change in volume of a polymer as a function of temperature.

Although the glass transition temperature of a given polymer comprises the maximum temperature at which the hollow fibers should be heated, improved internal burst strengths are obtainable even at temperatures as low as 50° C. In general, the preferred temperature range is from 50° C. below the glass transition temperature up to the glass transition temperature.

Heating times may vary widely from as little as five minutes up to five hours. However, most improvement in burst strength seems to be achieved within an hour, with little improvement observed beyond that time.

In the second aspect of the present invention, it has been found that when microporous polymeric hollow fibers made from polysulfone, polyethersulfone and polyetherimide are wet annealed, or heated in hot water at a temperature of from about 70° C. to about 160° C., not only is there significant improvement in internal burst pressures, but also dramatic improvement in the water permeabilities of such treated fibers. Heating times are similar to those stated above except that wet annealing of such fibers up to six hours still offers substantial improvement in burst strengths and water permeabilities.

EXAMPLES 1–10

Microporous polysulfone (PS) and polyethersulfone (PES) hollow fibers were spun from a dope comprising 30 wt% polymer and 20 wt% METHYLCELLOSOLVE ® in dimethylacetamide with lumen and external quench solutions of water. Static internal burst pressures were ascertained by forming a loop of the hollow fiber by connecting both ends to a common "T" fitting on a static hydraulic water pressure valve and pressurizing the inside of the fiber at a rate which increased about 10 psi per second until the fiber actually burst. Heat curing took place at the temperatures and for the times indicated. The results are reported in Table II.

TABLE II

| Ex. No. | Fiber | Initial Burst Pressure (psi) | Curing Temp. (°C.) | Curing Time (°C.) | Final Burst Pressure (psi) |
|---|---|---|---|---|---|
| 1 | PS | 775 | 100 | 10 | 800 |

TABLE II-continued

| Ex. No. | Fiber | Initial Burst Pressure (psi) | Curing Temp. (°C.) | Curing Time (°C.) | Final Burst Pressure (psi) |
|---|---|---|---|---|---|
| 2 | PS | 775 | 125 | 10 | 810 |
| 3 | PS | 775 | 150 | 10 | 840 |
| 4 | PS | 775 | 160 | 10 | 860 |
| 5 | PS | 775 | 180 | 10 | 900 |
| 6 | PES | 1040 | 160 | 10 | 1150 |
| 7 | PES | 1040 | 160 | 20 | 1155 |
| 8 | PES | 1040 | 160 | 40 | 1200 |
| 9 | PES | 1040 | 160 | 60 | 1200 |
| 10 | PES | 1040 | 160 | 120 | 1200 |

The RO performance of the heat-cured hollow fibers shown in Table II was studied by forming a salt-rejecting film on the lumens of such fibers and feeding a 5000 ppm NaCl aqueous solution at various pressures between 800 and 1000 psi and 25° C. through the lumens of the so-formed composite hollow fiber membranes for periods of 10 minutes. The fibers were tested through 100 such pressurization cycles and none of the composite membranes with heat-cured fiber supports burst. As compared to composite membranes with non-heat cured fiber supports, salt rejection of the heat-cured membranes remained basically the same—quite high at 96% and 98%—and the flux for such membranes remained substantially the same as well. RO composite membranes with annealed hollow fiber supports thus are quite well suited for desalination of sea water and other waste waters requiring operating pressures in the neighborhood of 800 psi.

There follow examples of the wet annealing aspect of the present invention.

EXAMPLES 11–22

Microporous PES and polyetherimide (PEI) hollow fibers were prepared and tested for burst strength as noted above after wet annealing, and were also tested for gas and water permeability by conventional methods. The wet annealing was accomplished by immersing the fibers in a tank of hot water at the temperatures and for the times noted in Table III, with the results noted therein.

TABLE III

| Ex. | Fiber | Temp (°C.) | Time Min. | Burst Pressure (psi) Before | After | Water Permeability (gfd/psi) Before | After | Air Permeability (SCFH/ft²-100 psi) Before | After |
|---|---|---|---|---|---|---|---|---|---|
| 11 | PES** | — | — | 690 | 690 | 0.05 | 0.05 | 10 | 10 |
| 12 | PES | 70 | 30 | 690 | 780 | 0.05 | 0.3 | 10 | 300 |
| 13 | PES | 90 | 30 | 690 | 790 | 0.05 | 0.2 | 10 | 300 |
| 14 | PES | 100 | 30 | 690 | 780 | 0.05 | 0.6 | 10 | 460 |
| 15 | PES | 120 | 30 | 690 | 830 | 0.05 | 0.4 | 10 | 350 |
| 16 | PES | 140 | 30 | 690 | 820 | 0.05 | 0.2 | 10 | 170 |
| 17 | PEI** | — | — | 1260 | 1260 | 0.02 | 0.02 | 50 | 50 |
| 18 | PEI | 90 | 30 | 1260 | 1280 | 0.02 | 0.02 | 50 | 100 |
| 19 | PEI | 100 | 30 | 1260 | 1340 | 0.02 | 0.02 | 50 | 80 |
| 20 | PEI | 120 | 30 | 1260 | >1400* | 0.02 | 0.05 | 50 | 120 |
| 21 | PEI | 140 | 30 | 1260 | >1400* | 0.02 | 0.34 | 50 | 260 |
| 22 | PEI | 160 | 30 | 1260 | >1400* | 0.02 | 1.2 | 50 | 490 |

*Fiber did not burst at 1400 psi
**Not wet-annealed

EXAMPLES 23–34

Similar tests were run on similarly-made PEI and PES fibers wet annealed at 90° C. for varying times, with the results shown in Table IV.

TABLE IV

| Ex. | Fiber | Temp (°C.) | Time Min. | Burst Pressure (PSI) Before | After | Water Permeability (gfd/psi)* Before | After | Air Permeability (SCFH/ft²-100 psi) Before | After |
|---|---|---|---|---|---|---|---|---|---|
| 23 | PES* | — | — | 690 | 690 | 0.05 | 0.05 | 10 | 10 |
| 24 | PES | 90 | 15 | 690 | 780 | 0.05 | 0.5 | 10 | 370 |
| 25 | PES | 90 | 30 | 690 | 790 | 0.05 | 0.2 | 10 | 300 |
| 26 | PES | 90 | 45 | 690 | 780 | 0.05 | 0.5 | 10 | 430 |
| 27 | PES | 90 | 60 | 690 | 780 | 0.05 | 0.3 | 10 | 420 |
| 28 | PES | 90 | 120 | 690 | 780 | 0.05 | 0.6 | 10 | 420 |
| 29 | PEI* | — | — | 1260 | 1260 | 0.02 | 0.02 | 50 | 50 |
| 30 | PEI | 90 | 15 | 1260 | 1300 | 0.02 | 0.03 | 50 | 51 |
| 31 | PEI | 90 | 30 | 1260 | 1280 | 0.02 | 0.02 | 50 | 100 |
| 32 | PEI | 90 | 45 | 1260 | 1280 | 0.02 | 0.03 | 50 | 60 |
| 33 | PEI | 90 | 60 | 1260 | 1290 | 0.02 | 0.03 | 50 | 75 |
| 34 | PEI | 90 | 120 | 1260 | 1270 | 0.02 | 0.03 | 50 | 55 |

*Not wet annealed

EXAMPLES 35–36

Polyvinylidenedifluoride (PVDF) fibers spun from PVDF and sold under the trade name Kynar by Pennwalt Corporation of Philadelphia, Pa. were wet-annealed at 95° C. for 30 minutes and compared with identical non-wet-annealed fibers, with the results shown in Table V.

TABLE V

| Ex. No. | Burst Pressure (psi) Before | Burst Pressure (psi) After | Water Permeability (gfd-psi) Before | Water Permeability (gfd-psi) After |
| --- | --- | --- | --- | --- |
| 35* | 176 | 176 | 0.64 | 0.64 |
| 36 | 176 | 233 | 0.64 | 1.67 |

*Not wet-annealed

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A process for increasing both the internal burst pressure and the gas and water permeability of a lumen-side feed microporous polymeric hollow fiber made from a polymer selected from polysulfones, polyethersulfones and polyetherimides, said process comprising heating said hollow fiber in water at a temperature from 70° C. to 160° C.

2. A process for increasing both the internal burst pressure and the gas and water permeability of a lumen-side feed microporous polymeric hollow fiber made from polyvinylideneflourides, said process comprising heating said hollow fiber in water at approximately 95° C.

* * * * *